(12) United States Patent
Griffin

(10) Patent No.: US 12,028,463 B1
(45) Date of Patent: *Jul. 2, 2024

(54) SYSTEMS AND METHODS OF GROUP SIGNATURE MANAGEMENT WITH CONSENSUS

(71) Applicant: Wells Fargo Bank, N.A., San Francisco, CA (US)

(72) Inventor: Phillip H. Griffin, Raleigh, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,080

(22) Filed: Jul. 25, 2022

Related U.S. Application Data

(63) Continuation of application No. 16/719,127, filed on Dec. 18, 2019, now Pat. No. 11,398,916.

(51) Int. Cl.
*G06F 21/40* (2013.01)
*H04L 9/30* (2006.01)
*H04L 9/32* (2006.01)
*G06F 21/64* (2013.01)

(52) U.S. Cl.
CPC ............... *H04L 9/3255* (2013.01); *H04L 9/30* (2013.01)

(58) Field of Classification Search
CPC ................................ H04L 9/3255; H04L 9/30
See application file for complete search history.

(56) References Cited

U.S. PATENT DOCUMENTS

| 6,088,454 | A | 7/2000 | Nagashima et al. |
| 7,028,180 | B1 | 4/2006 | Aull et al. |
| 7,036,146 | B1 * | 4/2006 | Goldsmith ............... G06F 21/40 709/201 |
| 7,234,059 | B1 | 6/2007 | Beaver et al. |
| 7,346,171 | B2 | 3/2008 | Numao et al. |
| 7,363,339 | B2 | 4/2008 | Delany et al. |
| 7,472,277 | B2 | 12/2008 | Halcrow et al. |

(Continued)

FOREIGN PATENT DOCUMENTS

| WO | WO-2019/080933 | A1 | 5/2019 |
| WO | WO-2019/198548 | A1 | 10/2019 |
| WO | WO-2020098840 | A2 * | 5/2020 ......... G06F 21/6218 |

OTHER PUBLICATIONS

Kunlun Fu, Lianhai Wang, Wei Shao, Wei Wang, Shuhui Zhang, Shujiang Xu, Shanshan Hu; "Supervisory Scheme for Blockchain Privacy Protection Technique Based on Group Signature"; 2021 ACM International Conference on Intelligent Computing and its Emerging Applications, Dec. 2021, pp. 223-228 (Year: 2021).*

(Continued)

*Primary Examiner* — Fatoumata Traore
*Assistant Examiner* — Courtney D Fields
(74) *Attorney, Agent, or Firm* — Foley & Lardner LLP

(57) ABSTRACT

Systems and methods are described for leveraging group signature technology to allow a group manager to set up rules that govern what requires consensus between members of the group. Consensus may require a plurality or a majority of signers using their individual private keys to use a group public key associated with the group. Group membership with group signatures allow for one group public key and a plurality of private keys, where each private key is associated with a group member.

20 Claims, 4 Drawing Sheets

(56) References Cited

U.S. PATENT DOCUMENTS

| | | | |
|---|---|---|---|
| 7,475,046 | B1 | 1/2009 | Foley et al. |
| 7,533,270 | B2 | 5/2009 | Gentry |
| 7,571,324 | B2 | 8/2009 | Canard et al. |
| 7,904,722 | B2 | 3/2011 | Sudia et al. |
| 8,117,230 | B2 | 2/2012 | Shaji et al. |
| 8,245,047 | B2 | 8/2012 | Zaccone et al. |
| 8,346,668 | B2 | 1/2013 | Fujita |
| 8,397,291 | B2 | 3/2013 | Miyazaki et al. |
| 8,522,040 | B2 | 8/2013 | Camenisch et al. |
| 8,661,251 | B2 | 2/2014 | Prouff et al. |
| 8,689,000 | B2 | 4/2014 | Chen et al. |
| 8,838,984 | B2 | 9/2014 | Aharonov et al. |
| 8,874,769 | B2 | 10/2014 | Mao et al. |
| 8,977,661 | B2 | 3/2015 | Cidon et al. |
| 9,015,231 | B1 | 4/2015 | Hodgman et al. |
| 9,052,375 | B2 | 6/2015 | Sampigethaya et al. |
| 9,325,694 | B2 | 4/2016 | Du et al. |
| 9,860,069 | B2 | 1/2018 | Patey et al. |
| 9,954,684 | B2 | 4/2018 | Popa et al. |
| 9,973,342 | B2 | 5/2018 | Lyubashevsky et al. |
| 10,033,702 | B2 | 7/2018 | Ford et al. |
| 10,225,258 | B2 | 3/2019 | Camenisch et al. |
| 11,240,025 | B2 * | 2/2022 | Wentz ............... G06F 21/64 |
| 2002/0007335 | A1 | 1/2002 | Millard et al. |
| 2002/0156719 | A1 | 10/2002 | Finebaum et al. |
| 2003/0195857 | A1 | 10/2003 | Acquisti |
| 2004/0078341 | A1 | 4/2004 | Steichen |
| 2004/0128259 | A1 | 7/2004 | Blakeley et al. |
| 2005/0169461 | A1 * | 8/2005 | Canard ............ H04L 9/3255 380/28 |
| 2006/0184666 | A1 | 8/2006 | Nozawa et al. |
| 2007/0104104 | A1 | 5/2007 | Abu-Amara |
| 2007/0255661 | A1 | 11/2007 | Yoshida et al. |
| 2008/0221945 | A1 | 9/2008 | Pace et al. |
| 2009/0089575 | A1 | 4/2009 | Yonezawa et al. |
| 2012/0166808 | A1 | 6/2012 | Hong et al. |
| 2016/0330034 | A1 | 11/2016 | Back et al. |
| 2016/0335629 | A1 | 11/2016 | Scott |
| 2018/0006826 | A1 | 1/2018 | Smith et al. |
| 2018/0173747 | A1 | 6/2018 | Baird, III |
| 2018/0204191 | A1 | 7/2018 | Wilson et al. |
| 2018/0343126 | A1 | 11/2018 | Fallah |
| 2019/0028277 | A1 | 1/2019 | Jayachandran et al. |
| 2019/0044700 | A1 | 2/2019 | Leddy |
| 2019/0087893 | A1 | 3/2019 | Pellew |
| 2019/0114706 | A1 | 4/2019 | Bell et al. |
| 2019/0132350 | A1 | 5/2019 | Smith et al. |
| 2021/0126797 | A1 * | 4/2021 | Peng ............... H04L 9/3239 |

OTHER PUBLICATIONS

Agarwal et al., "A Survey of Group Signature Technique, its Application and Attacks", International Journal of Engineering and Innovative Technology, vol. 2, Issue 10, Apr. 2013. 8 pages.

Emura et al., "An r-Hiding Revocable Group Signature Scheme: Group Signatures with the Property of Hiding the Number of Revoked Users", Hindawi Publishing Corporation, Journal of Applied Mathematics, vol. 2014, Article ID 983040, Published Jun. 1, 2014. 15 pages.

Katurde et al., "Secured Group Data Sharing in Cloud Computing", International Journal of Advanced Computational Engineering and Networking, vol. 7, Issue 7, Jul. 2019. 3 pages.

Kumar et al., "A Novel Technique for Data Sharing and Forwarding Through Cost Effective Identity Concept", IJCSEST, Sep. 2016 Issue. 7 pages.

Leshkowitz, Maya, "Group Signature Schemes with Distributed Traceability (or how to open a signature fairly)", Jun. 22, 2018. 7 pages.

Li et al., "Hidden attribute-based signatures without anonymity revocation", Information Sciences 180 (2010) 1681-1689.

* cited by examiner

SYSTEMS AND METHODS OF GROUP SIGNATURE MANAGEMENT WITH CONSENSUS

CROSS-REFERENCE TO RELATED APPLICATION

This application is a continuation of U.S. patent application Ser. No. 16/719,127, filed on Dec. 18, 2019, the content of which is incorporated herein by reference in its entirety.

BACKGROUND

There are many different types of digital signature schemes and each type has its own characteristics, usage benefits, and drawbacks. Some of these signature schemes can be described as anonymous digital signature schemes and they all differ in some way from what may be described as more traditional signatures associated with X.509 digital certificates and the SignedData type defined in the Cryptographic Message Syntax (CMS) standards widely used by businesses (X9.73), in the IETF to implement secure electronic mail, or X.894 that standardizes CMS for the telecommunications industry. In some digital signature schemes, consensus is required from some number of the total of group signature signers in order to use the group signature.

SUMMARY

Systems and applications are provided that leverage group signature technology to allow a group manager to set up rules that govern what requires consensus between members of the group. Consensus may require a plurality or a majority of signers using their individual private keys to use a group public key associated with the group. Group membership with group signatures allow for one group public key and a plurality of private keys, where each private key is associated with a group member. Signatures created by different group members are indistinguishable to verifiers but the group manager is able to determine which member has signed. In some implementations, cooperation of a Digital Certificate authority is needed to implement controls and limits or disallow revoked members from using their private key.

Various implementations relate to a group consensus system including a network interface circuit and a consensus circuit. The network interface circuit may be configured to receive data signed with a group signature, wherein each of a plurality of user computing systems have respectively signed the data with a threshold signature of the group signature. The consensus circuit may be configured to analyze the data and determine a category of the data based on the analysis. In some implementations, the group consensus system further includes an opener circuit. The opener circuit may be configured to open identities of the senders associated with each of the plurality of user computing systems based on the category of the data. The consensus circuit may further be configured to apply one of a predetermined rule or parameter to the data signed with the group signature based on the identities of the senders and accept and transmit the signed data based on application of the one of the predetermined rule or parameter.

In some implementations, the consensus circuit is further configured to generate a public key for use with the signed data prior to accepting and transmitting the signed data. In some implementations, the consensus circuit is further configured to transmit the generated public key along with the signed data. In some implementations, accepting and transmitting the signed data is further based on the identities of the senders associated with each of the plurality of user computing systems. In some implementations, the predetermined rule or parameter is received from a group coordinator system, wherein the group coordinator system is not able to open identities of the senders associated with each of the plurality of user computing systems. In some implementations, an updated predetermined rule or updated parameter is received from a group coordinator system, and wherein the updated predetermined rule or updated parameter replaces the respective predetermined rule or parameter prior to application, wherein the group coordinator system is not able to open identities of the senders associated with each of the plurality of user computing systems. The group coordinator system may be controlled by a business or organization of which the plurality of senders are employees of.

Other implementations relate to one or more methods. The one or more methods may be executing on a group consensus system. A method may include receiving, from a server, data signed with a group signature, wherein each of a plurality of user computing systems have respectively signed the data with a threshold signature of the group signature, analyzing, using a consensus circuit, the data, determining, using the consensus circuit, a category of the data based on the analysis, opening, using an opener circuit, identities of the senders associated with each of the plurality of user computing systems based on the category of the data, applying, using the consensus circuit, one of a predetermined rule or parameter to the data signed with the group signature based on the identities of the senders, and accepting and transmitting the signed data based on application of the one of the predetermined rule or parameter.

In some implementations, a method may further comprise generating a public key for use with the signed data prior to accepting and transmitting the signed data. In some implementations, a method may further comprise transmitting the generated public key along with the signed data. Accepting and transmitting the signed data may be further based on the identities of the senders associated with each of the plurality of user computing systems. The predetermined rule or parameter may be received from a group coordinator system, wherein the group coordinator system is not able to open identities of the senders associated with each of the plurality of user computing systems. An updated predetermined rule or updated parameter may be received from a group coordinator system, wherein the updated predetermined rule or updated parameter replaces the respective predetermined rule or parameter prior to application, and wherein the group coordinator system is not able to open identities of the senders associated with each of the plurality of user computing systems.

Other implementations relate to non-transitory computer-readable storage media storing instructions that are executable by one or more processors to perform operations including one or more of the above methods.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Figure 1:
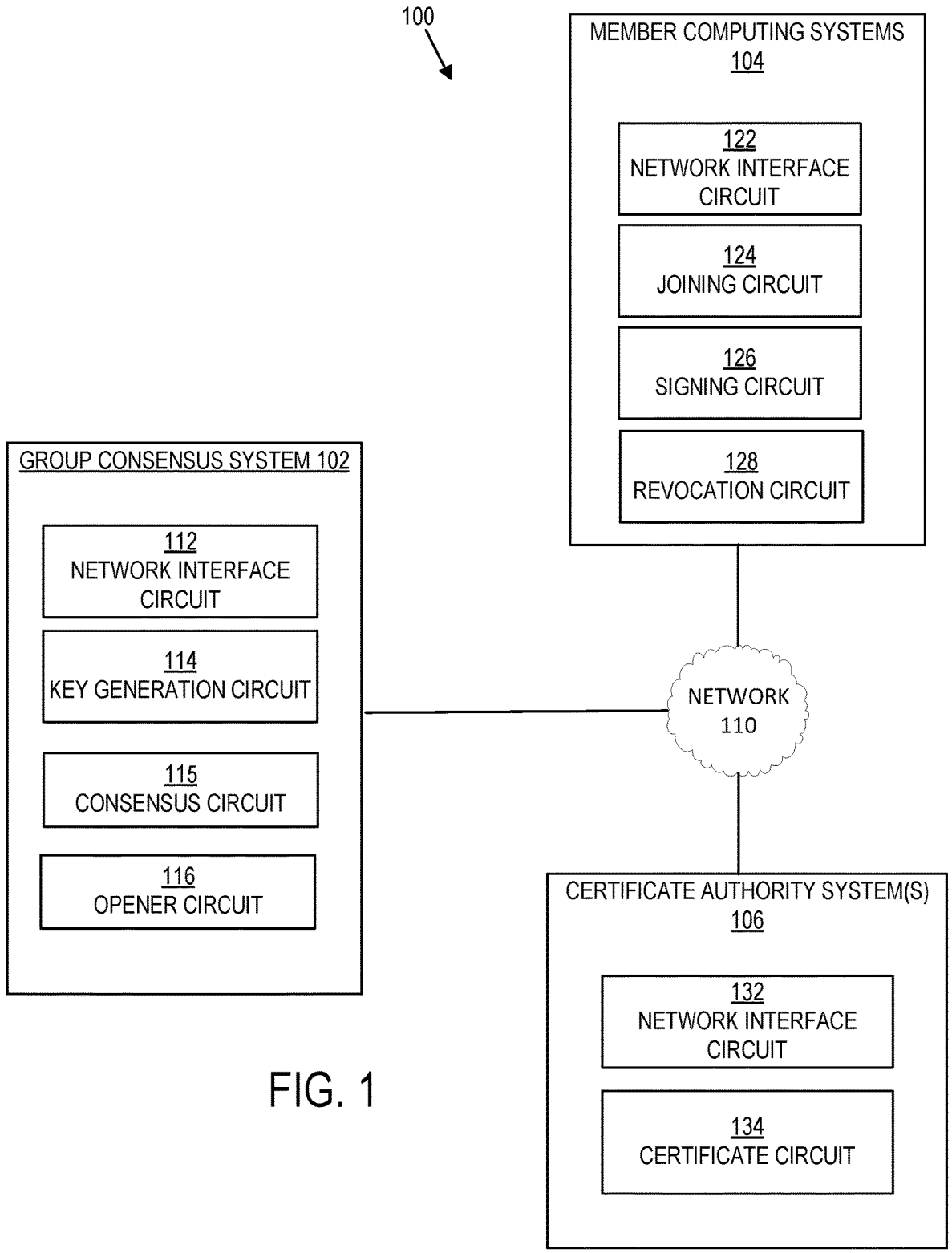
FIG. 1 is a schematic diagram of a group consensus environment, according to an example implementation.

Systems and applications are provided that leverage group signature technology to allow a group manager to set up rules that govern what requires consensus between members of the group. Consensus may require a plurality or a majority of signers using their individual private keys to use a group public key associated with the group. Group membership with group signatures allow for one group public key and a plurality of private keys, where each private key is associated with a group member. Signatures created by different group members are indistinguishable to verifiers but the group manager is able to determine which member has signed. In some implementations, cooperation of a Digital Certificate authority is needed to implement controls and limits or disallow revoked members from using their private key.

These implementations solve the technical problem of implementing a group signature scheme with consensus while defining rules, parameters, and/or thresholds for number of and/or identifying characteristics of group members required for approval to sign with a group signature. Digital certificates are used within some institutions to authenticate the identities of devices, employees, business partners, regulators, etc. Cryptographic keys associated with Digital Certificates may be used to sign ordinary email, create electronic signatures that comply with ESIGN and UETA requirements, sign transactions or smart contracts in blockchain or other Distributed Ledger Technology (DLT) environments, or enable entity authentication. All these activities expose the subject group public key included in these digital certificates to unintended uses without sufficient consensus amount the members of the group.

Group signatures are anonymous digital signature mechanisms in which a relying party uses a single group public key to verify the digital signatures of all group members, while each group member has their own distinct, private signing key. In some implementations, in a managed group signature environment each member of the group has a public and private key pair. A group manager, that may or may not also be member of the group, creates the security parameters related to the group and may issue the group public key and work with each member of the group in the creation of their respective private key. The creation of each respective private key may be an iterative process with where each private key is created to work with an already generated group public key. The end result is each group member ends up with each group's own assigned private key paired with the one public key. In some implementations, the private keys are generated as part of a threshold group signature such as a (t, n) threshold group signature scheme where t or more group members out of the total number of n group members is needed to digitally sign data that can be verified with the group public key. In some implementations, the group manager may generate the group public key after the threshold number of group signers have signed the data.

In some implementations, consensus may require a plurality or a majority of signers to use the group public key or to generate a group public key for use with the data to be sent. In some implementations, there is a group coordinator separate from the group manager. The group coordinator may define rules or parameters for a number of or identifying characteristics of group members that require consensus for a given data without having the ability to open the identities of any group members. The group manager may be a trusted party (e.g., a trusted third party) that has the ability to open the identities of any group members as needed. In some implementations, tools (e.g., applications, APIs, and the like) are provided to businesses or other organizations that allow a group coordinator associated with the businesses or other organizations to set up the rules and/or parameters for consensus. In some implementations, tools (e.g., applications, APIs, and the like) are provided to businesses or other organizations that allow a group coordinator associated with the businesses or other organizations to set up the rules and/or parameters for functionality available to group members regarding consensus signing. In some implementations, a group coordinator separate from the group manager can add or remove group members and define consensus rules. In some implementations, the businesses or other organizations may manage sub-groups to write to a public ledger, e.g., in a Distributed Ledger Technologies (DLT) context. In some implementations, there is a sub-consensus mechanism where a group manager manages the relationship with the group coordinator and group signatures enable group members to transact with an organization (e.g., a financial institution) on behalf of the coordinator. In some implementations, group consensus may be used in the restoration of a lost key of one or more members of the group. Restoration of a lost key may be done with sufficient consensus of the remaining members to restore a key or revoke a lost key and re-enroll the member with a new private key.

Referring to FIG. 1, a schematic diagram of a group consensus environment 100 is shown, according to an example implementation. The group consensus environment 100 comprises a group consensus system 102, one or more member computing system(s) 104, one or more certificate authority system(s) 106, and a network 110. Each of the group consensus system 102, one or more member computing system(s) 104, and certificate authority system(s) is in operative communication with one or more of the others via the network 110. The network 110 may include, for example, the Internet, cellular networks, proprietary banking networks, and the like.

Generally, the group consensus system 102 is used to manage membership, privacy, key generation of a plurality of digitally signed data, and receipt of signed consensus data. Although various implementations may be described in connection with example systems and methods, it should be understood that the systems and methods described herein may similarly be used to provide signed consensus data in undescribed types of systems and methods, such as enterprise security and other types of systems. In some implementations, the group consensus system 102 may also be configured to communicate with or function as a Certificate Authority (i.e., will also be configured to function as certificate authority system 106) to obtain and/or validate digital certificates or to issue and validate digital certificates. While the group consensus system 102, one or more member computing system(s) 104, and one or more certificate authority system(s) 106 are shown as separate entities in FIG. 1, in some implementations a respective system may perform some or all of the functions of one of the other systems. For example, in some implementations, the group consensus system 102 may perform some or all of the functions of the certificate authority system 106. In another example, the certificate authority system 106 may perform one or more of the functions of the group consensus system 102. In some implementations, the member computing system 104 performs some of or all of the functions of the group consensus system 102 (e.g., the functions of the key generation circuit 114).

The group consensus system 102 includes a network interface circuit 112, a key generation circuit 114, a consensus circuit 115, and an opener circuit 116. Generally, the group consensus system 102 is structured to generate or facilitate generating group keys for signing data. The group consensus system 102 may, for example, include one or more servers each with one or more processors configured to execute instructions stored in a memory, send and receive data stored in the memory, and perform other operations to implement use of signed consensus data functions and related functions as described herein. The network interface circuit 112 is structured to facilitate operative communication between the group consensus system 102 and other systems and devices over the network 110.

The group consensus system 102 may comprise a key generation circuit 114. In some implementations, the key generation circuit 114 is configured to generate public and private keys for various groups within an organization. In some implementations, the key generation circuit 114 is configured to request an associated group public key certificate from a Certificate Authority by a group manager. For example, a group has a plurality of members and a single manager, all associated with a single signature verification key. A trusted authority (e.g., a Certificate Authority) establishes the group with a public digital certificate associated with the group public key with each group member having their own signing private key with which digital signatures that can be verified using the group public key. In some implementations, each group member has a threshold private key, wherein for a given (t, n), t or more members can represent the group to generate signatures. The group manager may be able to open the t or more signatures signature associated with any group signature by showing which group members signed. In some implementations, a group manager when creating the group sets some security parameters (e.g., ISO, IC2008 standard group signature parameters). Once security parameters are set the key generation circuit may be configured to set up a consensus group through the issuance of a public key for the group and a public digital certificate associated with the public key through a request to a Certificate Authority or self-issuance. Each member of the group may be enrolled by deriving their respective private key. The creation of each respective private key may be an iterative process with where each private key is created to work with the already generated group public key. The end result is each group member ends up with their own assigned private key paired with the one public key. Each respective private key is derived to work with the established security parameters and the issued public group certificate. In some implementations, the private key is a threshold private key. The key generation circuit 114 may be configured to generate a threshold private key with every member randomly selecting a secret nonzero integer, negotiating communications key with the key generation circuit 114, and randomly selecting a secret integer for signing and communicating iteratively with the group manager which is verifying the signature to check its validity to calculate each respective private key.

The group consensus system 102 may comprise a consensus circuit 115. In some implementations, the consensus circuit 115 is configured to receive and generate communication to, including signed consensus data, (e.g., by using network interface 112) to a member of a group (e.g., to a member computing system 104). In some implementations, consensus circuit 115 is configured to determine when signed consensus data is received and a further determination made whether the signed consensus data is properly formatted and signed. The signed consensus data may be signed with a threshold number of threshold private signatures and accompanied by a digital certificate indicating membership in a group. The signed consensus data may be signed with a threshold number of threshold private keys and sent with a public key allowing for verification that the signer(s) belongs to a group. The signed consensus data may also be accompanied by information regarding which group the sender(s) belong to. In some implementations, consensus circuit 115 is further configured to verify that the signature associated with the signed consensus data matches the information regarding which group the sender belongs to. In some implementations, consensus circuit 115 is configured to verify a digital certificate associated with the signature.

In some implementations, the consensus circuit 115 is configured to analyze a requirement to open consensus signers and make a determination if the identity of the consensus signers needs to be opened. In some implementations, the consensus circuit 115 is configured to make a determination if any rules or parameters associated with the consensus should be applied to the received signed consensus data. In some implementations, the rules or parameters to be applied, if any, are determined by the signed data and a category of consensus to which the signed data belongs. For example, the data for which consensus has been reached may have different levels of criticality or importance. In some implementations, being above a certain level of criticality or importance requires opening of the signatures used to sign the data. In another example, the type of consensus reached by the necessary number of members of the group requires that at least one of the signing members be a manager within the business using the consensus system. The consensus circuit 115 may be configured to open the individual signer identities to verify that one of the signing members is a manager.

In some implementations, the opener circuit 116 is configured to open the identity of one or more signers of the signed consensus data. In some implementations, the opener circuit 116 is configured to open a signature signed by a threshold number of group members by identifying the members of the group that signed the signed consensus data. While threshold signatures that are created by different group members are indistinguishable to a verifier of the digital signature, they are not indistinguishable to the group manager (e.g., a group manager using group consensus system 102 and the opener circuit 116) who can disclose the identity of any member(s) of the group. In some implementations, the group manager has a secret master key that can be used to extract the identity of the signing group member. This capability provides the property of signer traceability, in what is are sometimes referred to as 'traceable signatures.' No one that is without possession of the secret master key (e.g., a secret master key held by a group manager) should be able to determine which group member was the signer. In some implementations, the opener circuit 115 is configured to use the attachment information (e.g., ($s_1$, $s_2 \ldots s_t, u_{s1}))$ of the signed data to find original signers depending on the attachment information.

In some implementations, the consensus circuit is configured to accept or reject the signed consensus data. In some implementations, accepting signed consensus data means transmitting the signed consensus data to the proper recipient. The signed consensus data may be accompanied by the group the sender of the signed consensus data is a member of.

The member computing system 104 may include a network interface circuit 122, a joining circuit 124, a signing circuit 126, and a revocation circuit 128. Generally, the member computing system 104 structured to help create threshold private keys for joining a group and sign data. The member computing system 104 may, for example, include one or more processors configured to execute instructions stored in a memory, send and receive data stored in the memory, and perform other operations as part of a group signature management with consensus environment 100. The network interface circuit 122 is structured to facilitate operative communication between the member computing system 104 and other systems and devices over the network 110.

The member computing system 104 may comprise a joining circuit 124. In some implementations, the joining circuit 124 is configured to join a new member using the member computing system 104 to a group by deriving a respective threshold private key for the new group member that is associated with the extant public group key. Further, the joining circuit 124 may be configured to join the group members by deriving a respective threshold private key. The joining circuit 124 may be configured to execute a joining portion of an iterative process where the respective private key for the newly joining group member is created by sending a random number by the joining circuit 124 to a system that determines whether the private key thus created will work with the already generated group public key. The joining circuit 124 may thus be configured such that it receives a respective, assigned private key paired with the one group public key. The joining circuit 124 may be configured to derive each respective threshold private key to work with the established security parameters associated with the group and the issued public group certificate.

Figure 4:
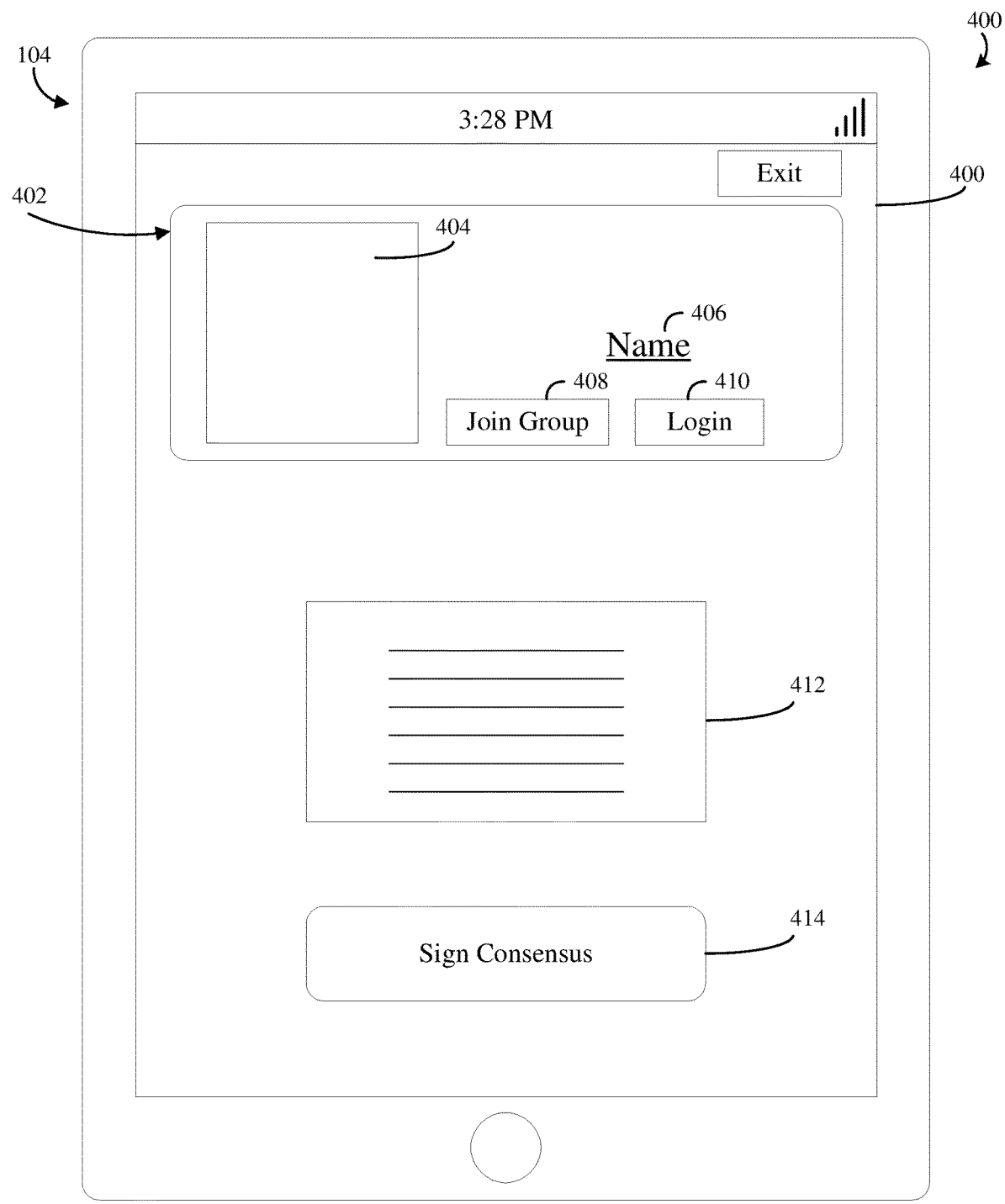
FIG. 4 is a schematic diagram of a graphical user interface for signing data associated with consensus according to an example implementation.

The member computing system 104 may comprise a signing circuit 126. In some implementations, the signing circuit 126 is configured to digitally sign data using the threshold private key of a group member associated with the respective member computing system 104. The signing circuit 126 may also be configured to send a request for a digital certificate associated with the threshold private key of the group member. In some implementations, a user may access signing circuit 126 through a graphical user interface on the member computing system 104 (e.g., a graphical user interface as illustrated in FIG. 4).

The member computing system 104 may comprise a revocation circuit 128. In some implementations, the revocation circuit 128 is configured to revoke the ability of the user to sign using their private key associated with the group public key. In some implementations, a user may access the revocation circuit 128 through a graphical user interface on the member computing system 104 (e.g., a graphical user interface as illustrated in FIG. 4). In some implementations, a user (e.g., using a graphical user interface 400) may ask to be revoked. In some implementations, an administrator may instead ask for a user to be revoked. The user may be fully revoked such that all signed data by the user is no longer verifiable or partially revoked such that data signed by the user going forward is no longer verifiable.

The certificate authority system 106 includes a network interface circuit 132 and a certificate circuit 134. The certificate authority system 106 may, for example, include one or more servers each with one or more processors configured to execute instructions stored in a memory, send and receive data stored in the memory, and perform other operations to implement the services described herein associated with the processing modules, databases, and processes. In some implementations, the certificate authority system 106 is configured to issue digital certificates. In one example, a digital certificate may certify the ownership of a public key by the named subject of the certificate. In some implementations, the format of these certificates may be specified by the X.509 standard. The network interface circuit 132 is configured to facilitate operative communication between the certificate authority system 106 and other systems and devices over the network 110. underlying signing mechanisms are based on cryptographic techniques that can be automated.

Figure 2:
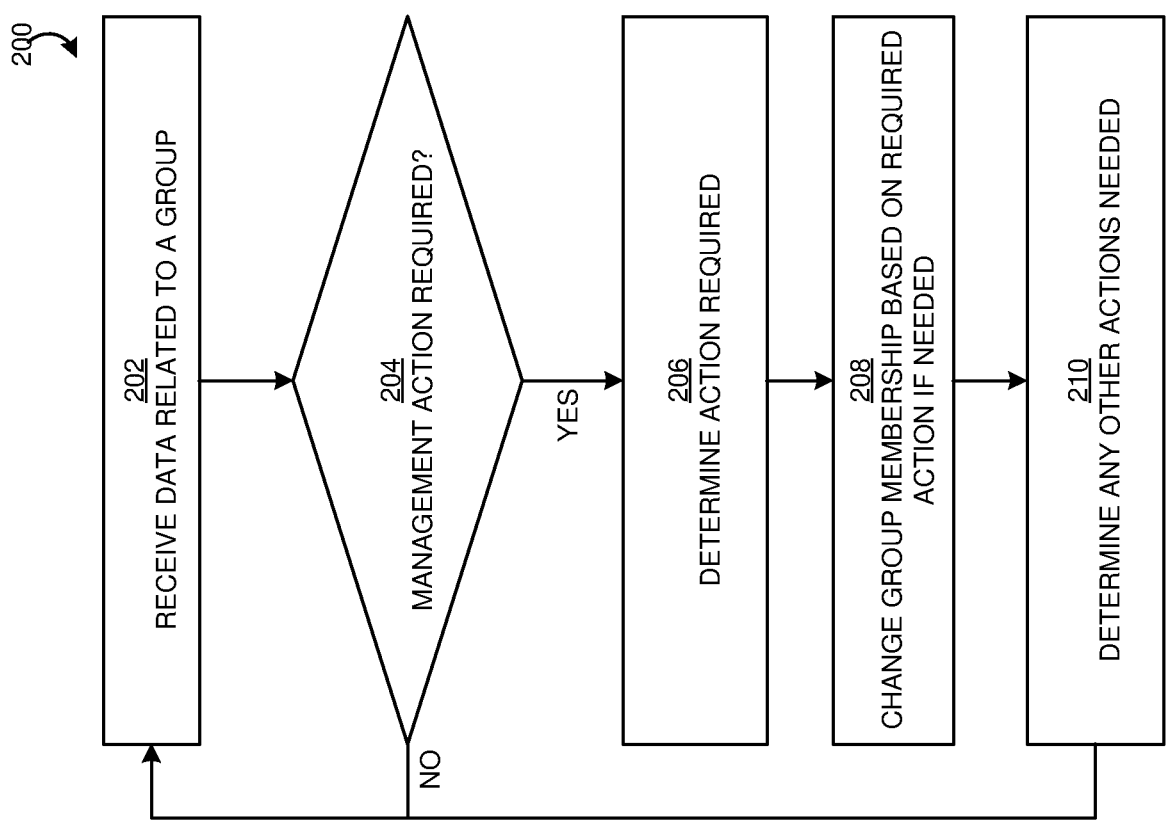
FIG. 2 is a flow diagram of a method of managing an action associated with group membership in a group consensus environment according to an example implementation.

Referring to FIG. 2, a flow diagram of a method 200 is shown of managing an action associated with group membership in a group consensus environment according to an example implementation. In some implementations, the method 200 is executed using a group consensus system 102 (e.g., a key generation circuit 114 and/or consensus circuit 115 of a group consensus system 102). In brief, method 200 comprises receiving data related to a group and determining if management action is required. If management action is required, the action required is determined, a group member may be added as part of the required action, and a determination is made if any other actions are needed.

Still referring to FIG. 2 and in more detail, at 202, data related to a group is received. In some implementations, the data may be associated with one or more members of the group. The data may be associated with a request to remove a member or add a member to the group. The data may be a request to add an individual to a group associated with a previously generated group public key. The data may also be accompanied by additional data providing support for evidence that the individual should be considered to be a member of the group they are being added to. The data may instead be a request to revoke group membership of one or more members of the group or to revoke membership of all members of the group and/or dissolve the group. In some implementations, the data related to the group may be information related to a member of a group no longer being employed with a business, government, or other entity associated with the group. In some implementations, the data related to the group may be information related to improper, malicious, or unlawful activity related to one or more group members that may prompt further action by the group manager.

At 204, a determination is made if management action is required and what action is required at 206. In some implementations, a management action may be the addition of an individual to a group membership to be associated with a previously generated group key and generating a threshold private key for the individual for use with the previously generated group key. In some implementations, a management action may be the revocation of group membership from a member of a group or a revocation of an available capability from a member of the group. The action required may be a creation or update of a blacklist or revocation list. In some implementations, the action required may be to revoke the entire group, revoke a single group member, or modify or remove specific signing capabilities of one or more members of the group. Where the action is being done by the Certificate Authority, the management action may be incorporated directly into a Digital Certificate validation or verification functionality of the Certificate Authority. Where the action is being done by a management system that is not the Certificate Authority (e.g., a group consensus system 102), the action may comprise sending instructions or an update to a Certificate Authority. The instructions or update may be signed or comprise other verification of the authority of the sender to make the requested changes.

At 208, a group membership may be changed based on the required action if needed. In some implementations, one or more group members may be added based on the determination of what action is required. In some implementations, the addition of an individual to a group membership to be associated with a previously generated group key. In some implementations, revocation of membership is done by a verifier blacklist. For example, in a verifier blacklist implementation, a verifier (i.e., a Certificate Authority) may generate a blacklist where the linking tag of any revoked members is checked against future signatures. In some implementations, if the check fails a value of '0' is outputted (i.e., revoked) and validates if a value of '1' is outputted. In some implementations, the blacklist or an update to the blacklist is transmitted to one or more Certificate Authorities that generate and/or verify digital certificates with the group certificate extension. In some implementations, the group manager may function as the Certificate Authority. Up to three levels of revocation may be performed, for example, the entire group may be revoked, a single group member may be revoked, or specific signing capabilities of one member may be revoked. In some implementations, a user (e.g., using a graphical user interface 400) may ask to be revoked. In some implementations, an administrator may instead ask for a user to be revoked.

At 210, a determination is made if any other actions are needed. In some implementations, addition of a group member or a revocation action may lead to other actions that need to be executed. Other actions may include, transmitting a notification to the group member that the group member has been added to the group or that a revocation of group membership has occurred. In some implementations, the initiation of generating a private key associated with the relevant group public key may commence as described above. In the event of a revocation of group membership, the notification may include details on why there is a revocation and/or what the group member would have to do to rejoin the group and/or regain functionality that was removed.

Figure 3:
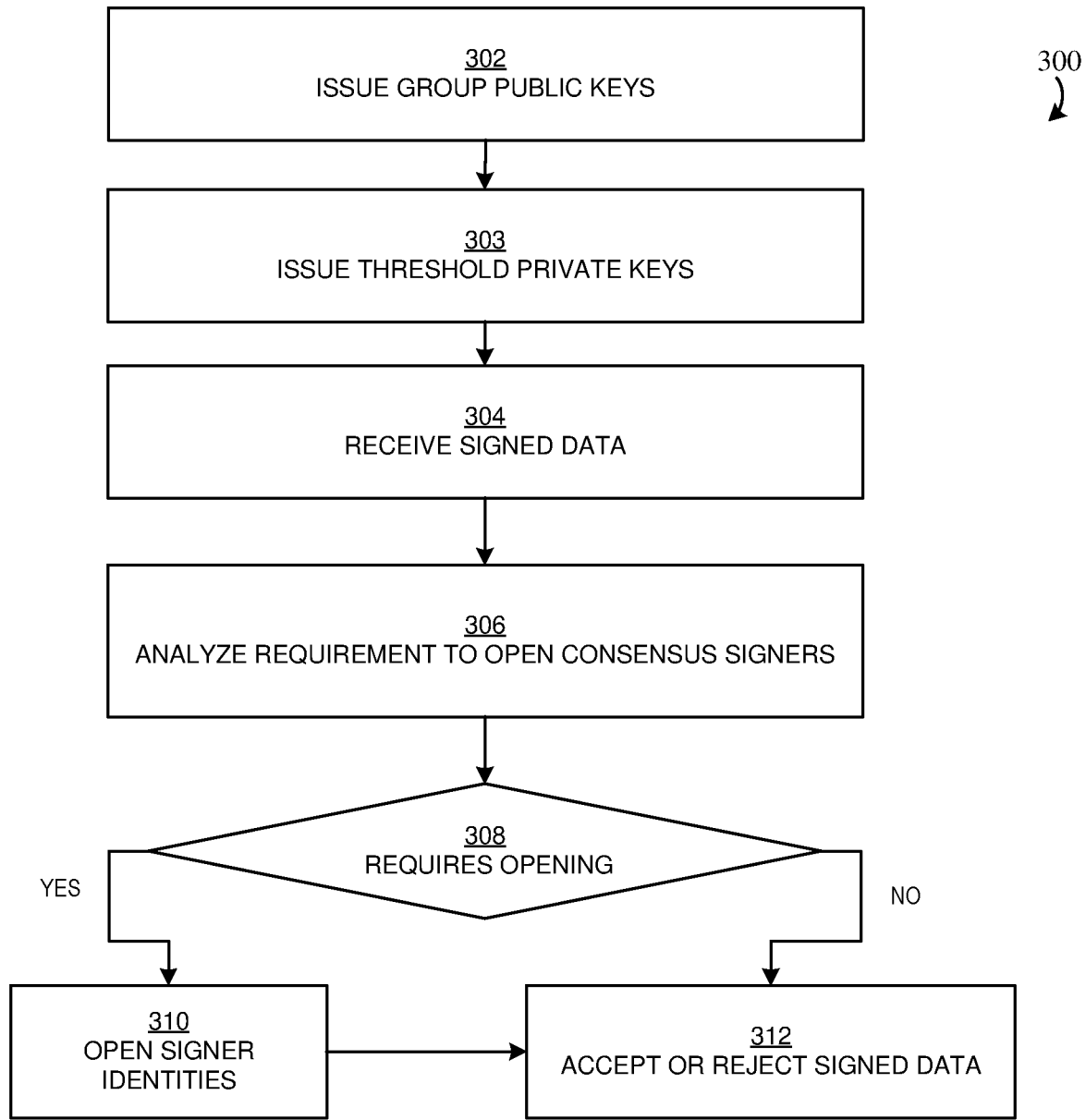
FIG. 3 is a flow diagram of a method of managing receiving signed data associated with consensus according to an example implementation.

Referring to FIG. 3, a flow diagram of a method 300 of managing receiving signed data associated with consensus is shown according to an example implementation. In some implementations, method 300 is executed using a group consensus system 102 (e.g., a key generation circuit 114, a consensus circuit 115, and an opener circuit 116). In brief, method 300 comprises issuing group public keys and receiving signed consensus data. If signed consensus data is received, identities of the signers may be opened and rules and/or parameters are applied based on the opening. Acceptance or rejection of the signed data may be based on opening the signer identities and applying any rules and/or parameters.

The method 300 begins at 302 and 304 with issuing group public keys. In some implementations, a group manager is responsible for generating public and private keys for various groups within an organization. For example, a group has a plurality of members and is managed by the group manager, with the adding of group members managed by the group manager. In some implementations, an associated group public key certificate is requested from a Certificate Authority by a group manager. For example, a group has a plurality of members and a single manager, all associated with a single signature verification key. A trusted authority (e.g., a Certificate Authority) establishes the group with a public digital certificate associated with the group public key with each group member having their own signing private key with which digital signatures that can be verified using the group public key. In some implementations, each group member has a threshold private key, wherein for a given (t, n), t or more members can represent the group to generate signatures. The group manager may be able to open the t or more signatures signature associated with any group signature by showing which group members signed. In some implementations, a group manager when creating the group sets some security parameters (e.g., ISO, IC2008 standard group signature parameters). Once security parameters are set the group may be set up through the issuance of a public key for the group and a public digital certificate associated with the public key through a request to a Certificate Authority or self-issuance. Each member of the group may be enrolled by deriving their respective private key. The creation of each respective private key may be an iterative process with where each private key is created to work with the already generated group public key. The end result is each group member ends up with their own assigned private key paired with the one public key. Each respective private key is derived to work with the established security parameters and the issued public group certificate. In some implementations, the private key is a threshold private key. These may be generated by every member randomly selecting a secret nonzero integer, negotiating communications key with the group manager, randomly selects a secret integer for signing and communicating iteratively with the group manager which is verifying the signature to check its validity to calculate each respective private key. The issued public group certificate may be issued with an extension (e.g., a group signature extension). The group certificate extension may analyzed (e.g., by an auditing computing system) to identify a value associated with the extension identifying the group manager. The group certificate extension may be designated as non-critical. For example, a certificate authority may validate a digital certificate without checking for the extension and/or any data values associated with the extension. In some implementations, the group manager is identified by a uniform resource identifier (URI) that allows for a determination of who is operating the group allowing for a request to be sent to open a signature associated with one of the group signatures. In some implementations, the certificate extension allows for a regulator with appropriate authority to contact the group manager for opening functionality. The certificate extension is discussed in more detail in application Ser. No. 16/429,629 which is incorporated herein in its entirety by reference. In some implementations where the group manager and the Certificate Authority are the same entity, the group manager may perform a revocation of membership for a member of the group, wherein the Certificate Authority is able to check the signature against a revocation list. In some implementations, the group manager may provide the information necessary to the Certificate Authority to check the signature against a revocation list or blacklist. A secure channel may have to be initiated between the group manager and each group member to maintain a secure, managed group.

At 304, signed consensus data is received and a determination made whether the signed consensus data is properly formatted and signed. The signed consensus data may be signed with a plurality of private signatures by a plurality of members. The signed consensus data may be accompanied by a digital certificate indicating membership in a group. The signed consensus data may also be accompanied by information regarding which group the senders belong to. In some implementations, receiving signed consensus data may include verifying that the signature(s) associated with the signed consensus data matches the information regarding which group the sender(s) belong to. In some implementations, receiving signed consensus data may include verifying a digital certificate associated with the signature. For example, the signature(s) associated with the signed consensus data may be verified to belong to a group that comprises executives of a company. In another example, the signature(s) associated with the signed consensus data may be verified to belong to a group that comprises a board of directors of a company. In another example, the signature(s) may be verified to belong to a group that comprises a particular government committee member in a larger governmental body.

At 306 and 308, a requirement to open consensus signers is analyzed and a determination is made if the identity of the consensus signers needs to be opened. In some implementations, a determination is made if any rules or parameters associated with the consensus should be applied to the received signed consensus data. In some implementations, the rules or parameters to be applied, if any, are determined by the signed data and a category of consensus to which the signed data belongs. For example, the data for which consensus has been reached may have different levels of criticality or importance. In some implementations, being above a certain level of criticality or importance requires opening of the signatures used to sign the data. In another example, the type of consensus reached by the necessary number of members of the group requires that at least one of the signing members be a manager within the business using the consensus system. The individual signer identities are opened by the consensus system to verify that one of the signing members is a manager. In some implementations, the group manager must be a trusted party in order to be given the capability of opening the received, signed consensus data. In some implementations, the group manager must be a trusted 3r d party in order to be given the capability of opening the received, signed consensus data and separate from any business or other organization using the group signature management with consensus environment (e.g., group signature management with consensus environment 100). In some implementations other conditions must first be met in order to open the received, signed consensus data. Conditions may include, the signed consensus data has been received by the appropriate group consensus system (e.g., group consensus system 102), the signed consensus data has been correctly signed using a group signature, and/or the signed consensus data meets any required formatting requirements. Other implementations and combinations for applying rules and parameters are possible depending on which group the signers are a member of, information contained in the signed consensus data, a category of the signed consensus data, a requirement to open, and/or other factors associated with receiving the signed consensus data signed with a group signature. In some implementations, application of the rules and/or parameters stems from a received request to open an identity of the signer. In some implementations, application of the rules and/or parameters stems from a received request to link an identity of the signer. Requests may, in some circumstances come from regulators with appropriate authority to contact a group manager for opening or linking functionality. In some implementations, this breaks the anonymity or partial anonymity (i.e., where one knows that someone in a group signed data but not the particular person) of the transaction in appropriate circumstances. In some implementations, using linking functionality, partial anonymity is still preserved as the only information provided is that two or more signatures are linked without revealing the particular signer in the group.

At 310, the identity of one or more signers of the signed consensus data is opened. In some implementations, a group manager of the group signature management with consensus environment (e.g., group signature management with consensus environment 100) has the ability to open a signature signed by a threshold number of group members by identifying the members of the group that signed the signed consensus data. While threshold signatures that are created by different group members are indistinguishable to a verifier of the digital signature, they are not indistinguishable to the group manager (e.g., a group manager using group consensus system 102 and the opener circuit 116) who can disclose the identity of any member(s) of the group. In some implementations, the group manager has a secret master key that can be used to extract the identity of the signing group member. This capability provides the property of signer traceability, in what is are sometimes referred to as 'traceable signatures.' No one that is without possession of the secret master key (e.g., a secret master key held by a group manager) should be able to determine which group member was the signer. In some implementations, the group manager uses the attachment information (e.g., $(s_1, s_2 \ldots s_t, u_{s1})$) of the signed data to find original signers depending on the attachment information.

At 312, the signed consensus data is accepted or rejected. In some implementations, accepting signed consensus data means transmitting the signed consensus data to the proper recipient. The signed consensus data may be accompanied by the group the sender of the signed consensus data is a member of. For example, in a business, the signed consensus data may be accompanied by the information that the signed consensus data is coming from executives of the company or from members of a particular department of the company. In another example, the signed consensus data may be accompanied by the information that the signed consensus data is coming from members of a particular governmental committee. In a further example, the signed consensus data may be accompanied by the information that the signed consensus data is coming from a group of individuals with a particular security clearance.

Referring now to FIG. 4, an interface 400 on a display of a member computing device (e.g., member computing device 104), including a graphical user interface for signing data associated with consensus is shown according to an example implementation. In some implementations, the interface 400 and/or any generated information and/or generated private or public key values or associated values affecting an appearance of the interface 400 is provided by a group consensus system (e.g., a consensus circuit 115 of a group consensus system 102). The interface 400 may include information relating to various applications related to sending signed consensus data. An identifying profile may be provided by the group consensus system 102. A profile area 402 of the interface 400 includes information relating to the individual user, including a profile picture 404 and a user name 406. The profile picture 404 and user name 406 may be selected by the user. A user may be able to join and/or access a list of groups they are a consensus member of by interacting with buttons 408 and 410 respectively. Various information related to group membership and current status may be displayed from within interface 400. In some implementations, a text area 412 may allow for entry of text associated with signed consensus data to be sent. In some implementations one or more display areas may be present on the interface 400, on pop-up screens, or additional screens of interface 400 (not shown) and used to display any applicable information associated with logging in to a particular group membership, joining a group, generating an associated threshold private key while joining a group, sending signed consensus data, receiving confirmation of sent signed consensus data, and the like. Other implementations of interface 400 for joining a group associated with a group signature, generating and sending signed consensus data and receiving confirmation may contain similar features.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may include or otherwise share the same processor which, in some example implementations, may execute instructions stored, or otherwise accessed, via different areas of memory). Alternatively or additionally, the one or more processors may be structured to perform or otherwise execute certain operations independent of one or more co-processors. In other example implementations, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some implementations, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit," as described herein, may include components that are distributed across one or more locations.

An exemplary system for implementing the overall system or portions of the implementations might include a general purpose computing computers in the form of a computer, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some implementations, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions include, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and arrangement of the implementations without departing from the scope of the present disclosure as expressed in the appended claims.

What is claimed:

1. A system, comprising:
    at least one memory; and
    at least one processor configured to:
        receive, from a server, data signed with a group signature, wherein each of a plurality of user computing systems has respectively signed the data;
        after receiving the data signed with the group signature, open identities of senders associated with each of the plurality of user computing systems based on a category of the data, wherein opening the identities of the senders associated with the plurality of user computing systems based on the category of the data comprises extracting the identities of the senders associated with the plurality of user computing systems based on the category of the data using a key; and
        transmit the signed data based on a rule or parameter, wherein the rule or parameter is received from a group coordinator system, wherein the group coordinator system is not able to open the identities of the senders.

2. The system of claim 1, wherein the at least one processor is further configured to generate a public key configured to sign the data prior to transmitting the signed data.

3. The system of claim 2, wherein the at least one processor is further configured to transmit the generated public key along with the signed data.

4. The system of claim 1, wherein the signed data is transmitted further based on the identities of the senders associated with each of the plurality of user computing systems.

5. The system of claim 1, wherein the at least one processor is further configured to accept the signed data based on the identities of the senders associated with each of the plurality of user computing systems.

6. The system of claim 1, wherein the at least one processor is further configured to receive an updated predetermined rule or updated parameter from the group coordinator system, and the updated predetermined rule or the updated parameter respectively replaces the rule or the parameter prior to transmitting the signed data, wherein the group coordinator system is not able to open identities of the senders associated with each of the plurality of user computing systems.

7. The system of claim 1, wherein the group coordinator system is controlled by a business or organization of which the plurality of senders are employees.

8. A method, comprising:
    receiving, from a server, data signed with a group signature, wherein each of a plurality of user computing systems has respectively signed the data;
    after receiving the data signed with the group signature, opening identities of senders associated with each of the plurality of user computing systems based on a category of the data, wherein opening the identities of the senders associated with the plurality of user computing systems based on the category of the data comprises extracting the identities of the senders associated with the plurality of user computing systems based on the category of the data using a key; and
    transmitting the signed data based on a rule or parameter, wherein the rule or parameter is received from a group coordinator system, wherein the group coordinator system is not able to open the identities of the senders.

9. The method of claim 8, further comprising generating a public key configured to sign the data prior to transmitting the signed data.

10. The method of claim 9, further comprising transmitting the generated public key along with the signed data.

11. The method of claim 8, wherein the signed data is transmitted further based on the identities of the senders associated with each of the plurality of user computing systems.

12. The method of claim 8, further comprising accepting the signed data based on the identities of the senders associated with each of the plurality of user computing systems.

13. The method of claim 8, further comprising receiving an updated predetermined rule or updated parameter from the group coordinator system, and the updated predetermined rule or the updated parameter respectively replaces the rule or the parameter prior to transmitting the signed data, wherein the group coordinator system is not able to open identities of the senders associated with each of the plurality of user computing systems.

14. The method of claim 8, wherein the group coordinator system is controlled by a business or organization of which the plurality of senders are employees.

15. At least one non-transitory computer-readable storage medium storing computer-readable instructions that are executed by one or more processors to perform operations comprising:
    receiving, from a server, data signed with a group signature, wherein each of a plurality of user computing systems has respectively signed the data;
    after receiving the data signed with the group signature, opening identities of senders associated with each of the plurality of user computing systems based on a category of the data, wherein opening the identities of the senders associated with the plurality of user computing systems based on the category of the data comprises extracting the identities of the senders associated with the plurality of user computing systems based on the category of the data using a key; and transmitting the signed data based on a rule or parameter, wherein the rule or parameter is received from a group coordinator system, wherein the group coordinator system is not able to open the identities of the senders.

16. The non-transitory computer-readable storage medium of claim 15, wherein the one or more processors are further configured to generate a public key configured to sign the data prior to transmitting the signed data.

17. The non-transitory computer-readable storage medium of claim 16, wherein the one or more processors are further configured to transmit the generated public key along with the signed data.

18. The non-transitory computer-readable storage medium of claim 15, wherein the signed data is transmitted further based on the identities of the senders associated with each of the plurality of user computing systems.

19. The non-transitory computer-readable storage medium of claim 15, wherein the one or more processors are further configured to accept the signed data based on the identities of the senders associated with each of the plurality of user computing systems.

20. The non-transitory computer-readable storage medium of claim 15, wherein the one or more processors are further configured to receive an updated predetermined rule or updated parameter from the group coordinator system, and the updated predetermined rule or the updated parameter respectively replaces the rule or the parameter prior to transmitting the signed data, wherein the group coordinator system is not able to open identities of the senders associated with each of the plurality of user computing systems.

\* \* \* \* \*